May 12, 1931.  C. KNOBLOCH  1,804,695
LIQUID LEVEL GAUGE
Filed July 30, 1926  2 Sheets-Sheet 1

Inventor:
Carl Knobloch,
By Samuel N. Pond, Atty.

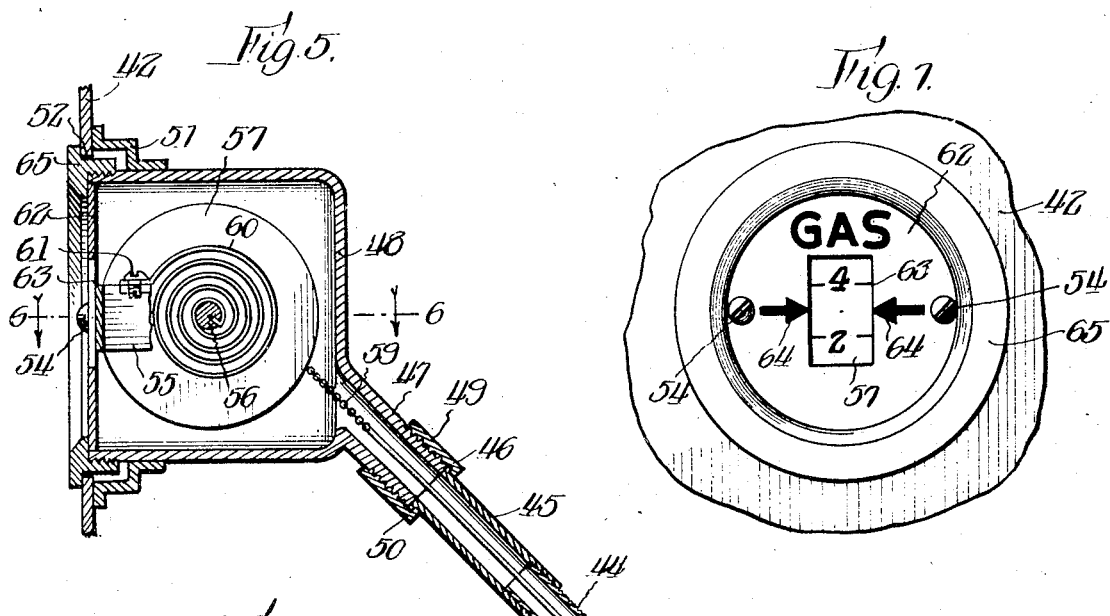

Patented May 12, 1931

1,804,695

UNITED STATES PATENT OFFICE

CARL KNOBLOCH, OF MIDDLETOWN, CONNECTICUT

LIQUID LEVEL GAUGE

Application filed July 30, 1926. Serial No. 125,844.

This invention relates to improvements in gauges of a type disclosed in Letters Patent No. 1,603,390, granted to me October 19, 1926, designed mainly for use on automobiles and other motor vehicles to accurately indicate the level of the liquid fuel in the gasoline tank of the vehicle, whether the latter be at rest or in motion, or on a level or an incline.

In my Letters Patent aforesaid I have disclosed a liquid level gauge including a self-contracting bellows diaphragm mounted in the tank containing the liquid and subjected interiorly to the hydrostatic pressure of the liquid in the tank and exteriorly to a uniform pressure, such as that of the atmosphere, a visual indicator, a mechanical connection between the diaphragm and the indicator, and a spring in the indicator tending to urge the movable member of the latter in a direction opposed to that in which it is urged by the contracting movement of the diaphragm, the contractile tension of the diaphragm being stronger than the tension of said spring so as to actuate the indicator in one direction against the urge of said spring as the liquid level in the tank falls and the diaphragm contracts; the indicator spring urging the pointer or dial in the opposite direction when the gasoline tank is refilled and the bellows diaphragm expanded by the hydrostatic pressure. The mechanical connection between the diaphragm and the indicator is constantly maintained taut and lost motion thus avoided by the opposing pulls of the diaphragm and the indicator spring thereon.

My present invention embodies certain improvements upon the gauge shown in my aforesaid Letters Patent, the chief of which resides in a novel construction and arrangement of the parts permitting the location of the bellows diaphragm exteriorly of the fuel tank and its connection either to the bottom of the fuel tank or to the gasoline supply line leading from the tank to the carburetor.

My present improvement is illustrated in the accompanying drawings, in which—

Fig. 4 is a view similar to Fig. 3, showing a modification wherein the diaphragm housing is applied directly to the bottom of the tank, and also omitting the guide pulley for the cord or chain at the bottom of the diaphragm housing;

Fig. 5 is a vertical section through the indicator on the line 5—5 of Fig. 6;

Fig. 6 is a horizontal section through the indicator on the line 6—6 of Fig. 5; and Fig. 7 is a front elevation of the indicator.

Figure 1:
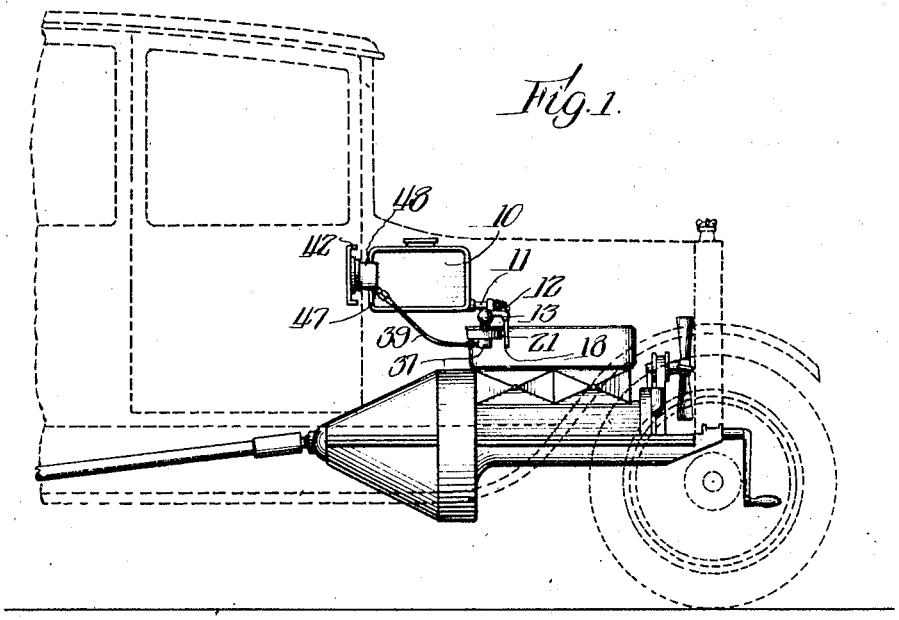
Fig. 1 is a diagrammatic side elevation of the fore part of an automobile, showing my improved gauge applied to a fuel tank located beneath the cowl, with the diaphragm housing attached to, and the contained diaphragm communicating with, the supply line from the tank to the carburetor.
Figure 2:
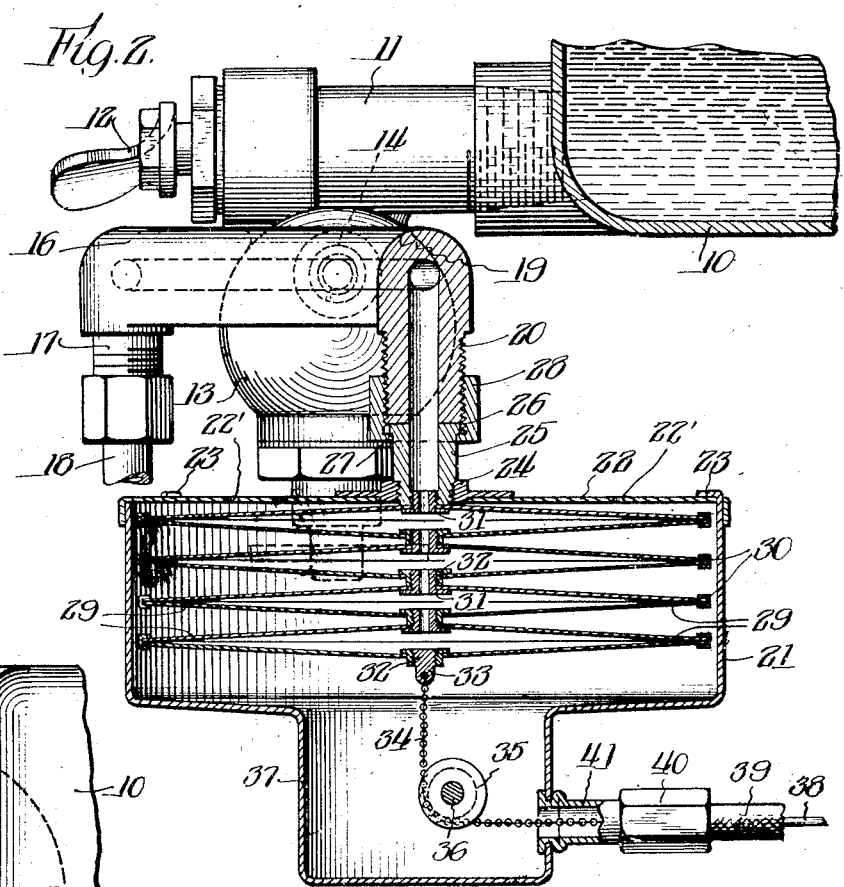
Fig. 2 is an enlarged vertical section of the diaphragm housing and diaphragm and immediately associated parts.
Figure 3:
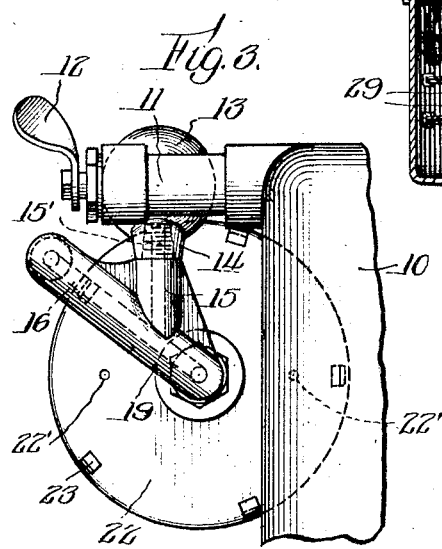
Fig. 3 is a top plan view, on a reduced scale, of the parts shown in Fig. 2.

Referring to the drawings, 10 designates the fuel tank, shown in Fig. 1 as of the gravity feed type, located in front of the dash and beneath the cowl, although the specific location of the tank on the vehicle is immaterial. In one well-known make of car, to which for purposes of illustration I have shown my improved gauge applied, there is connected into the lower portion of the tank 10 substantially at the level of the bottom thereof a line pipe coupling comprising a horizontal member 11 equipped with a flow cut-off valve 12 and an integral depending sediment bulb 13 formed near its top with a lateral tapped boss 14 (Fig. 3) into which is screwed one arm of an elbow coupling to the other end of which is connected the pipe leading to the carburetor. For convenient application of my present invention to this type of fuel tank and flow line, I discard the elbow coupling referred to, and substitute therefor a three-arm coupling such as is shown in Figs. 2 and 3; the same comprising a three-arm member, one arm 15 of which is formed with a nozzle 15' screwing into the boss 14, another arm 16 of which is formed with a threaded depending nozzle 17 to which is connected the flow line 18 to the carburetor, and the third arm 19 of which is formed with a depending threaded nozzle 20 for attachment of the diaphragm housing and diaphragm. The arms of the coupling and their threaded nozzles are formed with communicating bores, as clearly shown in Figs. 2 and 3.

21 designates the body and 22 the cover of a diaphragm housing, the body and cover being conveniently and cheaply united by forming on the upper edge of the body a group of integral tongues 23 which pass through holes in the marginal portion of the cover and are bent down over the top of the latter as clearly shown in Fig. 2. To the top of the cover 22 centrally thereof is soldered or otherwise attached an internally threaded collar 24 which receives the lower threaded end of a short hollow coupling member 25 the upper end of which is formed with an annular flange 26 engaged by an internal flange 27 on the lower end of a coupling nut 28 that screws onto the threaded nozzle 20. Within the housing is a bellows diaphragm comprising, as herein shown, a plurality of centrally connected bellows folds 29 each made of a pair of thin flexible sheet-metal discs united at their outer peripheries as by clamping rings 30 and normally tending to contract. The several folds of the bellows are centrally connected by hollow male and female bushings 31 and 32, the bushing 31 of the top leaf of the topmost fold threading into the lower end of the hollow coupling 25, so that the fuel can flow freely into the topmost fold of the bellows and from the latter into and through the underlying folds and expand the entire structure.

Screwed into the bushing 32 of the lowermost leaf of the bottom fold is an eye-bolt 33 to which is connected a chain or cord 34 that, in the instance shown, is guided over a pulley 35 on a shaft 36 mounted in the opposite side walls of a pulley housing 37 conveniently formed as an integral depending extension of the diaphragm housing 21. Beyond the pulley 35 the chain or cord 34 may be connected, as shown, to a wire 38 that is enclosed within a flexible tube 39, this latter being united by a clamping nut 40 to the outer end of a short tube section 41 mounted in the side of the pulley housing 37. The flexible tube 39 and the contained wire 38 extend, in the instance shown, rearwardly and upwardly toward the usual instrument board or panel 42 (Figs. 5 and 6) on the dash of the car. The connection of the rear end of the flexible tubing 39 to the indicator casing is preferably such as is shown in Fig. 5, which permits variations in the length of the tubing required for accurately adjusting the drum or other movable member of the indicator to correctly disclose the amount of fuel in the tank. Referring to Fig. 5, 43 designates a section of metal tubing into one end of which the rear end of the flexible tube or sheathing 39 is squeezed or otherwise connected. The tubular section 43 throughout the greater part of its length is externally threaded as indicated at 44 to screw into the internally threaded lower end of another section 45 of tubing, which latter is formed at its upper end with an annular flange 46 that abuts against the lower end of a threaded nipple 47 attached to or integral with the rear wall of the indicator housing 48. The tubing 45 is coupled to the nozzle 47 through the agency of a clamp nut 49 that screws onto the nozzle 47 and is formed at its lower end with an internal flange 50 engaging behind the flange 46 and drawing the latter into tight engagement with the lower end of the nozzle. The diaphragm housing is preferably formed with one or more vent holes, as 22', to insure a uniform (atmospheric) external pressure on the folds of the bellows diaphragm.

In Figs. 5, 6 and 7 I have illustrated a simple form of indicator which is preferably employed to display the readings at the dash of the car, although other types of indicator may be used. The indicator casing 48 is herein shown as a cylindrical shell open at its front end and clamped on the instrument board or panel 42 by an annular bracket 51 in which the shell is mounted and a ring nut 65 screwed onto the front end of the shell; the open end of the shell registering with a circular opening 52 in the panel 42. At diametrically opposite points near the front end of the shell 48 are inwardly extending lugs 53 (Fig. 6) to which are attached by screws 54 a pair of inwardly extending bracket arms 55. In and between the inner ends of the bracket arms 55 is journaled an arbor 56, fast on which is a dial drum 57, the periphery of which carries suitable scale marks indicating the condition of the gasoline supply in the tank. Fast on the arbor 56 at one side of the scale drum 57 is a pulley 58 to the periphery of which is attached a chain or cord 59 that is connected to the other end of the wire 38. It may here be stated that the pull connection between the diaphragm and the indicator pulley may be a continuous cord if desired. Attached to and encircling the arbor 56 on the other side of the drum 57 is a helical spring 60, the outer end of which is anchored by a screw 61 to one of the bracket arms 55. The open front end of the shell 48 is covered by a disc 62 conveniently attached to the lugs 53 of the shell by the screws 54. At the center of this disc is a rectangular window 63 (Fig. 7) lying directly in front of the periphery of the drum 57 and exposing to view a section of said periphery. On opposite sides of the window are a pair of arrows 64 designed to co-operate with the scale marks on the periphery of the drum to indicate the exact condition of the gas supply in the tank.

As the bellows diaphragm expands under the hydrostatic head of the fuel supplied to the tank 10 during the filling of the latter, the spring 60 winds the chain or cord 59 on the pulley 58 and at the same time actuates the drum 57 in a direction to indicate through the window 63 an increasing volume of fuel. As the level of the fuel in the tank falls, the hydrostatic pressure in the bellows gradually decreases, and the latter gradually contracts under its inherent elastic contractile tendency; and since this contracting tendency is stronger than the opposing urge of the spring 60, the indicator drum is gradually turned in the opposite direction so as to indicate through the window 63 gradually decreasing volumes of fuel in the tank.

The indicator readings are always steady, regardless of whether the car is idle, or traveling at high speed over a rough road, or on a level or a slope; this being due in part to the fact that jolting of the fuel in the tank does not vary the liquid pressure within the bellows diaphragm, partly to the fact that the pull connection between the diaphragm and the indicator is always under tension, and, therefore, taut owing to the opposing pulls thereon of the diaphragm and the indicator spring, and partly to the small passages between the diaphragm folds afforded by the hollow bushings 31 which retard the inflow and escape of the liquid to and from the folds, and thus steady the expanding and contracting movements of the diaphragm. I have found in practice that the location of the diaphragm externally of and below the level of the drum of the fuel tank is peculiarly advantageous in the way of avoiding pressure variations and consequent vibration or chattering of the indicator drum or pointer under jolting of the fuel in the tank. Such location has the further advantage of enabling the gauge to be readily applied to tanks already in place, even when the tank contains fuel by operating the cut-off valve 12, and avoids the necessity of drilling holes in the tank for its attachment, or partially dismantling the tank for the admission of the diaphragm and its housing, or building the diaphragm and housing into the tank during the construction of the latter.

In Figs. 1, 2 and 3 I have shown the diaphragm housing applied to the fuel supply line from the tank to the carburetor. In Fig. 4 I illustrate a slight modification wherein the diaphragm housing 13' is attached directly to the bottom wall 10' of a fuel tank, the contained diaphragm in that case communicating directly with the interior of the tank. This application is very easily made by simply unscrewing the drainage cock from the usual female bushing 66 which is riveted and soldered to the bottom of the tank, and then screwing into the bushing 66 a threaded stud 67 attached to the top of the diaphragm housing, said stud 67 having a hole 68 placing the interior of the tank in communication with the interior of the bellows diaphragm. In this view I have also illustrated a modification in the guiding and housing means for the connecting cord or wire, this construction omitting the guide pulley of Figs. 1 and 2, and substituting therefor a curved section 39' of flexible tubing attached to the bottom of the diaphragm housing by a coupling sleeve 69; this construction being especially practicable where a flexible wire may be employed as the pull connection between the diaphragm and indicator in lieu of a cord or chain.

While my former Patent No. 1,603,390, which shows the diaphragm housing and bellows diaphragm located within the gasoline tank, embodies the same broad principle of operation as my present invention, yet the latter, by locating the diaphragm housing and the bellows diaphragm outside the gasoline tank, effects a number of new results and very substantial advantages, among which may be mentioned the following. The gauge is easier to apply to the tank than where located within the tank, and does not have to be built into the tank; it can be made and sold as a distinct article of manufacture separate from the tank itself; it obviates the necessity of providing a pipe, such as the pipe 12 of my former patent, leading from the interior of the diaphragm housing to a point outside the gas tank in order to vent the diaphragm housing to the atmosphere; it avoids the necessity of making the diaphragm housing leak-proof against entrance of gasoline, which would nullify the functioning of the diaphragm where the diaphragm housing is located within and surrounded by the body of gasoline; it does not reduce the holding capacity of the gas tank; and it obviates all strain on the diaphragm housing attaching means caused by the splashing and surging of the gasoline against the diaphragm housing when the car is in motion.

I claim—

1. In a liquid level gauge, the combination of a container for liquid, a vertically disposed self-contracting bellows diaphragm subject externally to atmospheric pressure located beneath and at its upper end communicating with said container, an indicator, a mechanical connecting element between the lower end of said diaphragm and said indicator operating to transmit contracting movement of said diaphragm to said indicator, and a spring exerting a constant pull on said connecting element and actuating said indicator in the reverse direction during the expanding movement of said diaphragm.

2. In a liquid level gauge, the combination of a tank, an outflow pipe from said tank, a diaphragm box attached to and disposed beneath said pipe, a vertically disposed self-contracting bellows diaphragm in said box, said diaphragm being subject externally to atmospheric pressure and at its upper end communicating with said pipe, a guide pulley beneath said diaphragm box, an indicator, a cord connecting the lower end of said diaphragm with said indicator and guided over said pulley, and a spring exerting a pull on said cord in opposition to the pull exerted thereon by said diaphragm, said spring also actuating said indicator during the expanding movement of said diaphragm.

CARL KNOBLOCH.